US012780325B2

(12) United States Patent
Bartzik

(10) Patent No.: US 12,780,325 B2
(45) Date of Patent: Nov. 3, 2026

(54) DASHBOARD SUPPORT

(71) Applicant: Kirchhoff Automotive Deutschland GmbH, Attendorn (DE)

(72) Inventor: Josef Bartzik, Iserlohn (DE)

(73) Assignee: KIRCHHOFF AUTOMOBILE DEUTSCHLAND GMBH, Attendorn (DE)

(*) Notice: Subject to any disclaimer, the term of this patent is extended or adjusted under 35 U.S.C. 154(b) by 213 days.

(21) Appl. No.: 18/855,212

(22) PCT Filed: May 9, 2023

(86) PCT No.: PCT/EP2023/062271
§ 371 (c)(1),
(2) Date: Oct. 8, 2024

(87) PCT Pub. No.: WO2023/227363
PCT Pub. Date: Nov. 30, 2023

(65) Prior Publication Data

US 2025/0263128 A1 Aug. 21, 2025

(30) Foreign Application Priority Data

May 27, 2022 (DE) ..................... 10 2022 113 436.9

(51) Int. Cl.
*B62D 25/14* (2006.01)

(52) U.S. Cl.
CPC .................................. *B62D 25/147* (2013.01)

(58) Field of Classification Search
CPC .... B62D 25/147; B62D 25/145; B62D 27/02; B60R 2011/0005; B60K 37/10
See application file for complete search history.

(56) References Cited

U.S. PATENT DOCUMENTS 8,939,497 B2 1/2015 Baudart
9,381,883 B2 * 7/2016 Morita .................. B60R 21/203
(Continued)

FOREIGN PATENT DOCUMENTS

DE 102008045914 A1 3/2010
DE 102020125791 A1 4/2022
(Continued)

OTHER PUBLICATIONS

International Search Report (ISR) of the International Searching Authority (ISA-EP) mailed Sep. 9, 2023 in parent international application PCT/EP2023/062271.
Written Opinion (WO) of the International Searching Authority (ISA-EP) mailed Sep. 9, 2023 in parent international application PCT/EP2023/062271.
(Continued)

*Primary Examiner* — Huan Le
(74) *Attorney, Agent, or Firm* — Polson Intellectual Property Law P.C.; Margaret Polson; Christopher Sylvain

(57) ABSTRACT

A dashboard support for a motor vehicle with at least two support parts which follow the longitudinal extent of the dashboard support and are arranged to overlap one another with their mutually facing end portions. A first support part, in its overlapping portion, has a contact seat against which the second support part rests with its connecting portion provided by the overlapping arrangement with its lateral surface and is materially bonded to the first support part. The contact seat of the first support part is provided by an embossing which is designed as a negative structure in relation to the first support part.

15 Claims, 2 Drawing Sheets

(56) References Cited

U.S. PATENT DOCUMENTS

| | | | | |
|---|---|---|---|---|
| 9,409,606 | B2 * | 8/2016 | Eshima | B62D 25/145 |
| 9,446,800 | B2 * | 9/2016 | Davos | B62D 27/02 |
| 9,598,100 | B2 | 3/2017 | Lenkenhoff | |
| 10,577,025 | B2 | 3/2020 | Michler | |
| 11,731,707 | B2 | 8/2023 | Tentscher | |
| 11,851,109 | B2 | 12/2023 | Weige | |
| 11,858,577 | B2 | 1/2024 | Günther | |
| 11,912,343 | B2 * | 2/2024 | Bezeaukt | B60K 37/10 |
| 11,975,763 | B2 | 5/2024 | Gündogan | |
| 12,194,853 | B2 | 1/2025 | Günther | |
| 2013/0241235 | A1 | 9/2013 | Baudart | |
| 2023/0123267 | A1 | 4/2023 | Günther | |
| 2024/0166269 | A1 | 5/2024 | Günther | |
| 2024/0174036 | A1 | 5/2024 | Günther | |
| 2025/0001867 | A1 | 1/2025 | Lagin | |

FOREIGN PATENT DOCUMENTS

| | | | |
|---|---|---|---|
| DE | 202004011120 | U1 | 12/2025 |
| EP | 0990578 | A2 | 4/2000 |
| EP | 1655209 | A1 | 5/2006 |
| EP | 1816055 | A1 | 8/2007 |
| FR | 3006393 | A1 | 12/2014 |

OTHER PUBLICATIONS

International Preliminary Report on Patentability (IPRP Chapter II) of the International Preliminary Examining Authority (IPEA-EP) completed Mar. 25, 2024 in parent international application PCT/EP2023/062271.

Office Action dated Jan. 9, 2023 in related German application DE 102022113436.9.

Office Action dated May 8, 2023 in related German application DE 102022113436.9.

* cited by examiner

DASHBOARD SUPPORT

BACKGROUND

The disclosure relates to a dashboard support for a motor vehicle with at least two support parts which follow the longitudinal extent of the dashboard support and are arranged so as to overlap one another with their end portions facing one another, wherein a first support part has a contact seat in its overlapping portion, against which the second support part rests with its connecting portion provided by the overlapping arrangement with its lateral surface and is materially bonded to the first support part.

Dashboard/instrument panel supports/carriers are used to mount instruments and the steering column in a vehicle. Such a dashboard support is installed between two pillars, namely the A-pillars of a motor vehicle. To connect to the A-pillars, the dashboard support has corresponding mechanical connectors at both ends. An essential component of such a dashboard support is a support structure. This extends between the pillars of the vehicle body. The support structure can be provided with connections for instruments as well as other fixing points relative to the vehicle, such as floor supports by which the support structure is supported with the floor of the vehicle, for example in the area of a tunnel.

A dashboard support can, but does not have to, be straight. Often such a dashboard support is structured so that parts of it are offset from one another with respect to their longitudinal extent. The support parts are typically tubular bodies, which can also be composed of two or more shells or shell parts. In addition to dashboard supports which are made from a continuous support tube body, dashboard supports are also used in which several support parts which follow the longitudinal extent are provided. Depending on the design of the desired dashboard support, these are arranged axially aligned with one another or offset from one another with respect to their longitudinal extent. In the first case, a connecting sleeve is usually used to connect the two support parts. In a staggered arrangement, a beam connector, in many cases a metal connector, is used to connect the two beams. This connector bridges the gap due to the offset between two adjacent support parts.

A dashboard support in which two support parts are connected to one another with the interposition of a metal support part connector is known, for example, from DE 10 2008 045 914 A1. This metal connector is composed of two half-shells which are arranged with their opening side facing each other and with their joints adjacent to each other in order to provide a hollow chamber profile in the portion connecting the support parts. Each half shell provides a front stop for a support part. The two support parts are arranged in the area of the support part connector so as to overlap each other in the direction of their longitudinal extent. The two shells of the metal connector are firmly connected to each other. The same applies to the connection of the connector to the two support parts to be connected to it. A similar design of a support part connector, in which the support parts to be connected are arranged offset with respect to their longitudinal axis, is known from U.S. Pat. No. 8,939,497 B2. This support part connector is also composed of two half shells, which are inserted into each other.

From EP 1 816 055 A1, another dashboard support is known which is composed of two support parts which follow the longitudinal extent of the dashboard support. According to one embodiment of this state of the art, the two support parts are connected without an additional connector part. In order to connect the two support parts, which are designed as tubes of different diameters, a longitudinal cutout is made in one of the support parts along the length of the overlap. By removing this material from the carrier profile, an intervention option is provided in which the other support part can immerse its lateral surface according to the width of the longitudinal cutout. The result is that the first support part then rests with the joints of its longitudinal cutout on the lateral surface of the second support part in its connecting portion and can be welded to it on the outside. In this previously known dashboard support, the second support part is larger in diameter and has a thicker wall thickness. This support part is located on the driver's side so that it can withstand the higher loads of the dashboard support on the driver's side. For this reason, the longitudinal recess is located in the support part connected to the driver's side support part. The disadvantage of this concept is the proposed connection of two support parts of a dashboard support, as this is not suitable for the formation of hybrid material dashboard supports. An adhesive connection between the two support parts is not possible.

A dashboard support is known from EP 1 655 209 A1. This includes a central profile, a support strut leading to the vehicle floor and a reinforcement structure on the driver's side. This previously known dashboard support is an extruded profile with a first and a second partial profile, wherein the first partial profile corresponds to the central profile and the second partial profile corresponds to the reinforcement structure. In one design of this dashboard support, different extruded profiles are used for the two partial profiles. The first partial profile corresponding to the central profile has a cross-sectional geometry that has a concave recess. The reinforcement profile corresponding to the second partial profile is embedded in this recess, so that the reinforcement profile with its outer contour rests positively on the wall of the recess of the central profile. The two adjacent profiles are welded together. Profiles with cross-sections, such as in the example with the concave recess, can be easily manufactured as extruded profiles (hollow chamber profiles), but require increased effort if they are to be manufactured in a shell construction, for example from steel.

SUMMARY

Proceeding from this background, one aspect of the disclosure is to design a dashboard support of the type mentioned at the outset, in such a way that it not only meets high load requirements with regard to the connection point between the two support parts and the support parts can also be integrally bonded to one another by means of an adhesive connection if required, but further that the support parts can also be manufactured cost-effectively in a shell construction, for example from steel plates.

This may be provided by a dashboard support of the type mentioned at the outset, wherein the contact seat of the first support part is provided by an embossing or recessed portion which is designed as a negative structure with respect to the first support part and reinforces this section of the first support part in the manner of a bead.

In this dashboard support, an embossing of the first support part designed as a negative structure serves as the contact seat for the connecting portion of the second support part. This embossing creates a structure directed towards the interior of the first support part. This not only reinforces this portion of the first support part in the manner of a bead. Such an embossing simultaneously provides a surface against which the lateral surface of the connecting portion of the second support part comes in contact with a portion. Due to the part of the connecting portion of the second support part which engages in the embossing and then rests on the outer side of the embossing, a material doubling is created in this portion of the dashboard support, provided by the material thickness of the embossing of the first support part and that of the connecting portion of the second support part, which in turn improves the rigidity of the dashboard support, especially in the overlap area of its two support parts. At the same time, this also has a vibration-reducing effect. By placing a portion of the connecting portion of the second support part on the typically complementary outer side of the embossing, a sufficiently large area is provided so that both support parts can, if required, also be connected to one another via an adhesive connection as a material-bonded connection. Therefore, such a dashboard support can easily be designed as a hybrid dashboard support with regard to the material used for its support parts, even in a material composition in which one of the two support parts is a metal part and the other support part is a plastic part, typically fiber-reinforced.

The overlapping arrangement and the direct connection of the two support parts in the prescribed manner allows tolerance compensation during assembly with regard to the extension of the dashboard support in its longitudinal direction (y-direction).

The directions used in these explanations are the directions commonly used in vehicles. The x-direction points in the longitudinal extent of the vehicle. The y-direction is the transverse direction thereto. The z-direction corresponds to the vertical direction.

In an embodiment in which the connecting portion of the second support part is round, in particular circular, the outer contour of the embossing is expediently designed as a contact seat of the first support part with a complementary radius of curvature. In addition to other possible geometries, an embossing can also have a complementary geometry to a rounded corner design of the connecting portion of the second support part.

Preferably, the embossing, which extends with its longitudinal axis in the y-direction, is open in both the x-direction and the z-direction. This has the advantage that forces, for example, acting on the embossing of the first support part via the connecting portion of the second support part located in the embossing, are introduced into two portions of the first support part extending in different directions or are divided into these directions depending on the direction of the force application. In both directions, and thus in both the x-direction and the z-direction, such forces then act in the direction of the extension of the areas of the first support part adjacent to the embossing and not transversely thereto.

In one embodiment of such a dashboard support, the diameter of the first support part having the embossing is larger than that of the connecting portion of the second support part. In such an embodiment, the central longitudinal axis of the connecting portion of the second support part can be located in the region of the lateral surface of the first support part or even on the inside thereof before the embossing has been created. For example, the central longitudinal axis of the connecting portion of the second support part is located within the space enclosed by a horizontal plane arranged at the upper end of the embossing and a vertical plane arranged at the end of the embossing facing the passenger compartment. In such an embodiment, the second support part is offset from the first support part in the direction of the passenger compartment. Of course, it is also possible to connect the second support part to the opposite side of the first support part. Then, the above-mentioned space is limited by the vertical plane arranged at the front end of the embossing pointing in the direction of travel.

The portion of the first support part with the contact seat embossing can, as provided in one embodiment, be a portion which is widened in terms of its cross-sectional area compared to the adjacent support part portion. This portion of the first support part does not necessarily have to obtain the larger cross-sectional geometry through the process of widening, but can be constructed in this way.

According to one embodiment, the first support part is, at least in the area of its contact seat, a rectangular hollow chamber profile in cross-section, typically with a rounded corner design. The embossing forming the seat is preferably placed in such a corner area. In such an embodiment, the corner area, which initially represents a positive structure, is turned inwards by the embossing. Such a first support component can be composed of several shell parts, whereby the individual shell parts can be made of different materials and/or different material sections.

In the case of particularly stressed connections between the two support parts of such a dashboard support, an additional securing element can be applied. According to one embodiment, such a securing element is a bracket which encloses the portion of the connecting portion of the second support part which protrudes from the embossing and which is fixed in a material-bonding manner to the first support part adjacent to the contact seat—the embossing.

It is not uncommon to support the dashboard support with a strut, in particular a floor strut/brace, on the chassis side adjacent to the driver's side support part, which is typically the first support part. This is also possible with this dashboard support.

BRIEF DESCRIPTION OF THE DRAWINGS

The description is provided using an example embodiment with reference to the figures, wherein.

DETAILED DESCRIPTION

Figure 1:
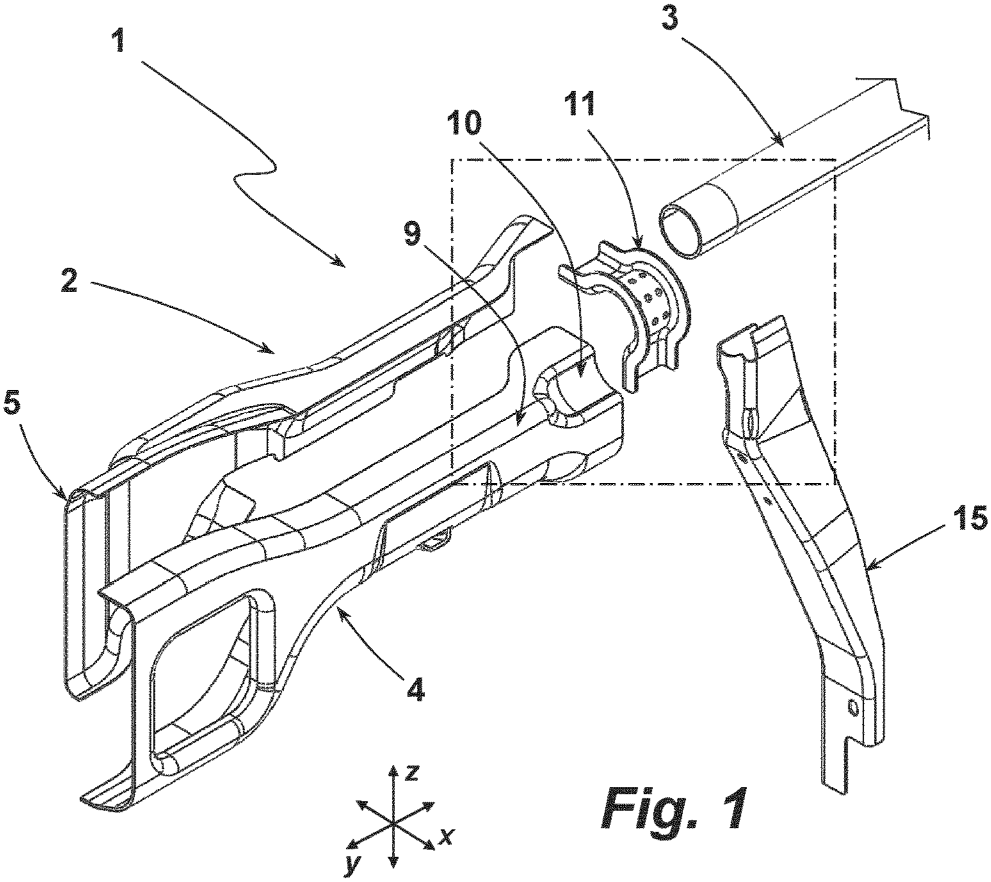
FIG. 1 is an exploded perspective view of a portion of a dashboard support with two support parts which follow the longitudinal extent of the dashboard support and are connected to one another.
Figure 2:
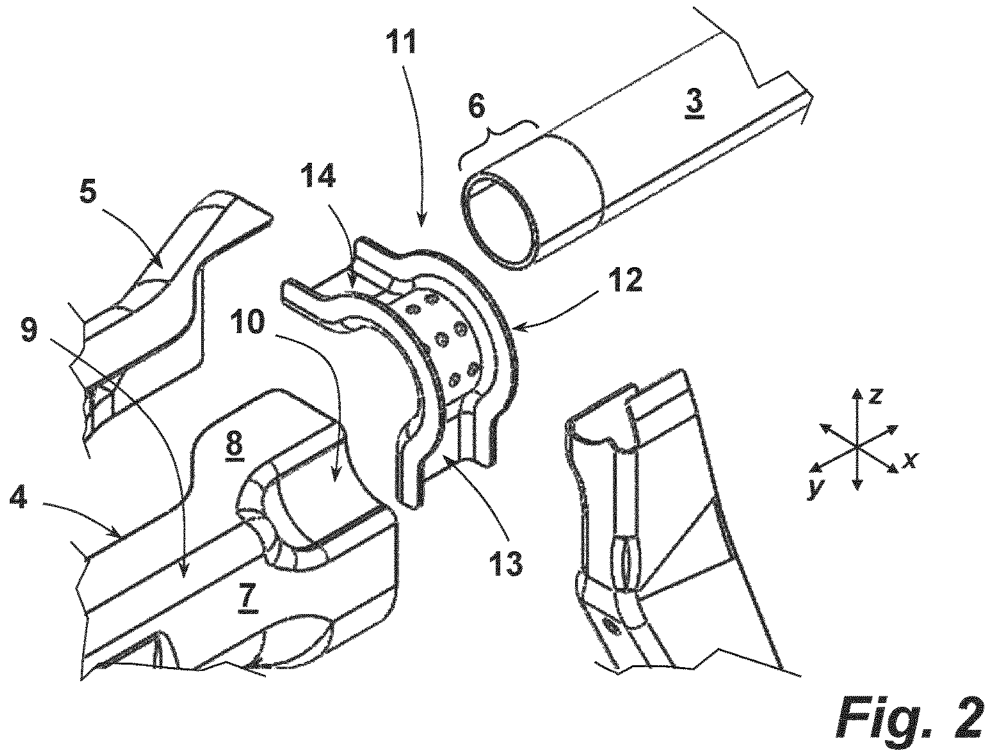
FIG. 2 is an enlarged view of the connection area of the two support parts.

A dashboard support 1, to be installed between the two A-pillars of a motor vehicle, has several support parts, of which a first support part 2 and a second support part 3 are shown in the figures. The first support part 2 is located in the part of the dashboard support 1 assigned to the driver's side of the vehicle and, in the illustrated example embodiment, is composed of two shells 4, 5. The assembled shells 4, 5 form a hollow chamber profile. This does not have to be closed all the way around over the entire longitudinal extent of the support part 2. In the example embodiment shown, the second support part 3 is a cylindrical tube.

The two support parts 2, 3 extending in the longitudinal extent of the dashboard support 1 are arranged in an overlapping arrangement of their mutually facing end portions and are connected to one another in a materially bonding manner. The end portion of the second support part 3, with which it overlaps the first support part 2, is referred to as connecting portion 6 in the context of these embodiments. Due to the corresponding design of the shells 4, 5, the support part 2 is noncircular and rectangular with rounded edges in the overlapping portion. The cross-sectional area of the overlapping portion of the first support part 2 is several times larger than that of the second support part 3. The orientation of the installed dashboard support 1 with respect to its first support part 2 assigned to the driver's side is provided such that the front wall and the rear wall 7 facing the passenger compartment of the motor vehicle extend in the z-direction. A contact seat 10 is formed in the edge 9 which is designed with a radius and which connects the rear wall 7 with the upper wall 8 and extends over the overlap with the support part 3. The contact seat 10 is a negative structure with respect to the design of the support part 2, i.e. an embossed or recessed portion introduced into the support part 2 or the shell 4 in the direction of the interior of the support part 2. The embossing is designed with a radius which, in the illustrated example embodiment, corresponds to the radius of the lateral surface of the connecting portion 6 of the support part 3. The contact seat 10 extends approximately over approximately 90 degrees in the circumferential direction of the connecting portion 6, so that the connecting portion 6 rests against the contact seat 10 of the support part 2 over a portion of approximately 90 degrees. The contact seat 10 is open in the direction of the support part 3. At its other end pointing in the direction of the longitudinal extent of the dashboard support 1 there is a transition portion in which the negative structure formed by the embossing transitions into the adjacent portion of the support part 3.

The flat contact seat 10 provides a sufficiently large contact area between the two support parts 2, 3 so that both support parts 2, 3 can, if desired, be firmly attached to one another in a material bonding manner by gluing. If the two support parts 2, 3 are metal parts, the support parts 2, 3 can be welded together instead of or in addition to an adhesive connection. The transition from the contact seat 10 to the rear wall 7 and the upper wall 8 is suitable for placing the weld seam, as this creates a groove in each case. Such a weld seam can extend over the entire length of the overlap or the connecting portion 6. In addition, it is possible to place a further weld seam on the portion of the end face of the support part 3 which borders on the contact seat 10, as well as between the lateral surface of the support part 3 and the open end of the contact seat 10. In the example embodiment shown, the shells 4, 5 of the support part 2 as well as the support part 3 are made of a steel suitable for these purposes. The material bonding joints are welded joints.

If increased demands are placed on the connection between the two support parts 2, 3, a bracket 11 can additionally be provided as a securing element, as is the case in the example embodiment shown. This bracket is designed so that its central, curved portion 12 encloses the part of the lateral surface of the connecting portion 6 which is not located on the contact seat 10. Connecting portions 13, 14 are formed on this middle portion for the material bonding connection of the bracket 11 to the support part 2. The connecting portion 13 serves to connect the bracket 11 to the rear wall 7, while the connecting portion 14 serves to rest on and connect to the upper wall 8. The material bonding connection between the bracket 11 and the support part 2 can in turn be connected in a material bonding manner to the support part 2 and, if desired, also to the support part 3 either by gluing or by welding.

If individual parts of the dashboard support are joined together by an adhesive connection, it is advisable to harden them inductively if at least one of the joining partners has the necessary ferromagnetic properties. This is the case when a steel material is used for such purposes.

A strut 15 is connected to the portion of the dashboard support 1 shown in the figures, adjacent to the support part connection. In the example embodiment shown, the strut 15 is a floor or tunnel support strut. The upper end of the strut 15, which is adapted to the curvature of the lateral surface of the support part 3, is connected to the support part 3 by a joint connection. In addition, the front side of the strut 15 facing the support part 2 is integrally connected by material bonding to the latter.

Figure 3:
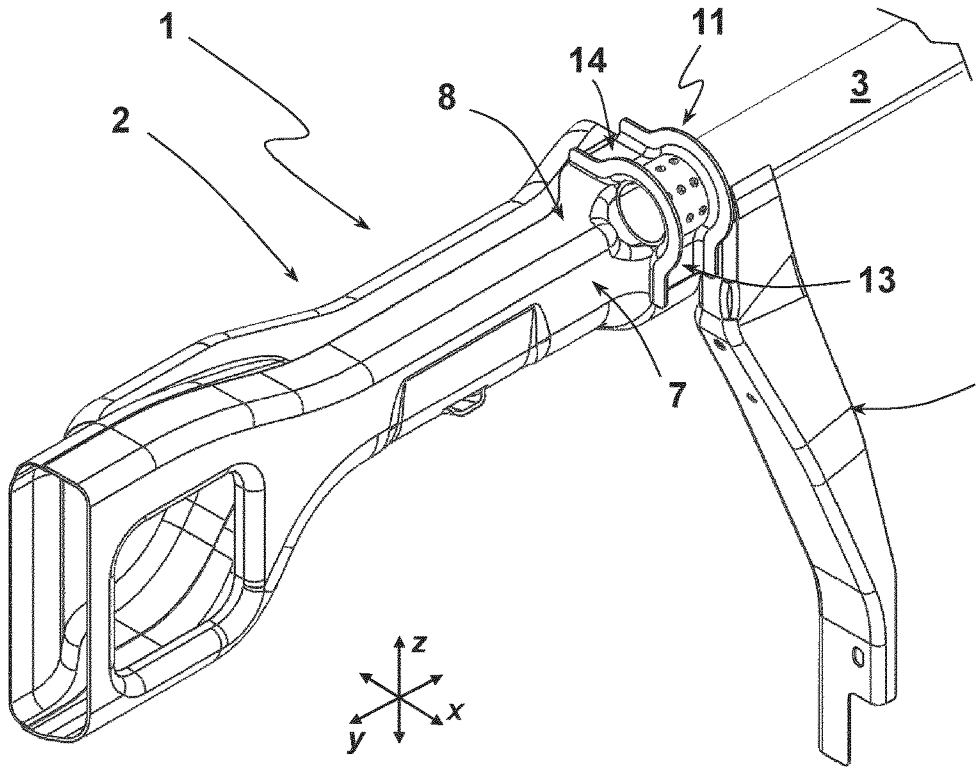
FIG. 3 shows the portion of the dashboard support of FIG. 1 in its assembly.

FIG. 3 shows the portion of the dashboard support 1 in the assembly of the two support parts 2, 3, the bracket 11 and the strut 15.

Figure 4:
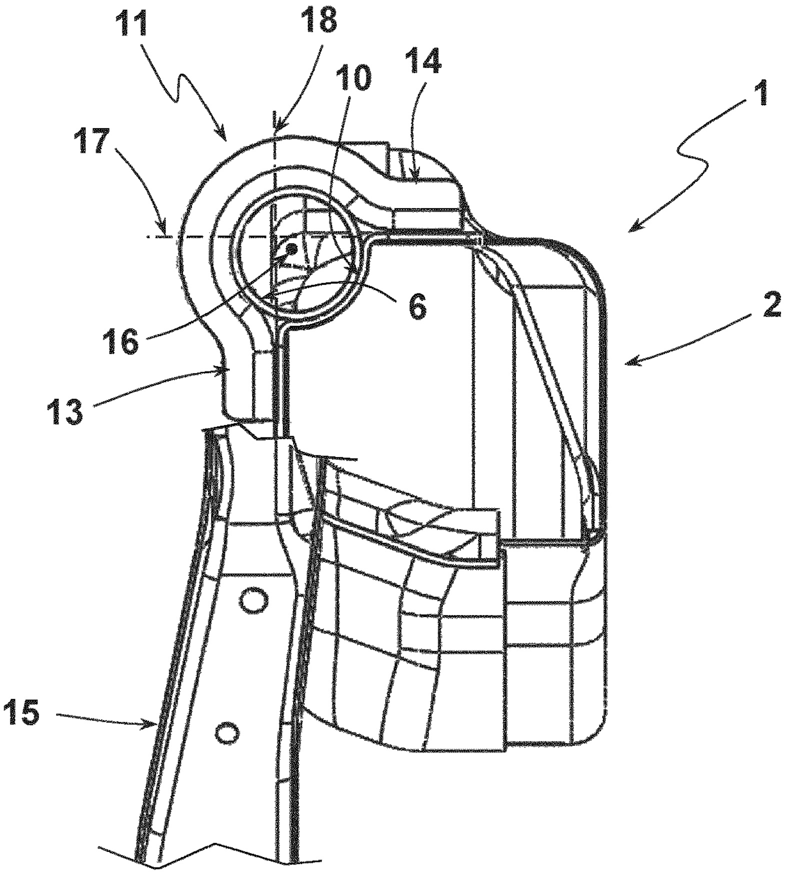
FIG. 4 is a side view of the dashboard support of FIG. 3.

FIG. 4 shows a side view from the direction of view of the support part 3 onto the support part 2. In this illustration, the upper end portion of the strut 15 is shown cut off in order to be able to see the bracket 11 as a whole. The contact of the lateral surface of the connecting portion 6 with the outer side of the contact seat 10 formed by the embossing can be clearly seen.

From the illustration in FIG. 4 it is also particularly clear that the second support part 3 with its connecting portion 6 protrudes both in the x-direction, namely in the direction of the passenger compartment of a vehicle, and in the z-direction upwards from the embossed portion of the support part 2 forming the contact seat 10. The contact surface between the connecting portion 6 of the support part 3 and the contact seat 10 of the support part 2, which extends over approximately 90 degrees of the lateral surface of the connecting portion, has the consequence that the central longitudinal axis 16 of the connecting portion 6 is located within the boundary of a space formed by a plane 17 extending the upper wall 8 and a plane 18 extending the rear wall 7. As a result of this arrangement measure, provided by the embossing designed as a negative structure for forming the contact seat 10, forces between the support part 2 and the support part 3 are transmitted into or via the rear wall 7 and the upper wall 8 into the support part 3 or vice versa. A deformation of the contour of the contact seat 10 and thus an impairment of the connection between the two support parts 2, 3 is thus effectively counteracted even when a force is applied.

LIST OF REFERENCE NUMERALS

1 Dashboard support
2 Support part
3 Support part
4 Shell
5 Shell
6 Connecting portion
7 Rear wall
8 Upper wall
9 Edge
10 Contact seat
11 Bracket
12 Middle portion
13 Connecting portion
14 Connecting portion
15 Strut
16 Longitudinal axis
17 Plane
18 Plane

The invention claimed is:

1. A dashboard support for a motor vehicle, comprising:

a first support part and a second support part which follow a longitudinal extent of the dashboard support and are arranged to overlap one another with mutually facing end portions, wherein the first support part, in an overlapping end portion thereof, has a contact seat against which a connecting portion of the second support part rests and is connected to the first support part in a materially bonded manner, wherein the contact seat of the first support part is provided by an embossing which is formed as a negative structure in relation to the first support part directed towards an interior of the first support part, and which reinforces the first support part in the manner of a bead, and wherein the connecting portion of the second support part engaging in the embossing rests with a lateral surface on an outer side of the embossing.

2. The dashboard support of claim 1, wherein a contour of the outer side of the embossing of the contact seat corresponds at least in portions to the lateral surface of the second support part in the connecting portion provided for contact with the contact seat.

3. The dashboard support of claim 1, wherein the second support part in the connecting portion has a circular cross-sectional geometry and the outer side of the embossing has the same radius of curvature as the connecting portion of the second support part brought into contact therewith.

4. The dashboard support of claim 1, wherein the embossing of the first support part is open in an x direction, which points in a direction of the longitudinal extent of the dashboard support, and in a z direction, which points in a vertical direction, and the connecting portion of the second support part protrudes in the x direction and in the z direction from the embossing formed by the negative structure.

5. The dashboard support of claim 4, wherein a central longitudinal axis of the connecting portion of the second support part is located within a space enclosed by a horizontal plane forming an upper end of the embossing and a vertical plane forming an end of the embossing pointing into a vehicle passenger compartment.

6. The dashboard support of claim 4, wherein an upper end of the embossing continues into a section of the first support part extending in the x direction.

7. The dashboard support of claim 4, wherein an end of the embossing pointing into a vehicle passenger compartment continues into a section of the first support part extending in the z direction.

8. The dashboard support of claim 1, wherein, at least in a region of the contact seat, the first support part is a hollow chamber profile with a rectangular cross-section, and the embossing forming the contact seat is introduced in an upper corner region of the rectangular cross-section on a side of the hollow chamber profile facing a vehicle passenger compartment.

9. The dashboard support of claim 8, wherein the first support part in the region of the contact seat has a larger cross-sectional geometry than in a region of the first support part adjacent thereto.

10. The dashboard support of claim 8, wherein the first support part is composed of several shells.

11. The dashboard support of claim 1, wherein the connection between the connecting portion of the second support part is additionally secured by a bracket fixed in a materially bonded manner to the first support part adjacent to the contact seat as a securing element.

12. The dashboard support of claim 1, wherein a strut for supporting the dashboard support on a vehicle chassis side is connected to the second support part adjacent to the connecting portion.

13. The dashboard support of claim 12, wherein the strut is a floor or tunnel strut.

14. The dashboard support of claim 1, wherein the connection between the first support part and the second support part is a fusion joint, carried out at least in grooves following a longitudinal extent of the embossing between the embossing or edges of the embossing of the first support part and the lateral surface of the connecting portion of the second support part.

15. The dashboard support of claim 1, wherein the connection between the first support part and the second support part is an adhesive connection between the outer side of the embossing and the lateral surface of the connecting portion of the second support part resting on the embossing.

* * * * *